US008116587B2

(12) United States Patent
Shoaib et al.

(10) Patent No.: US 8,116,587 B2
(45) Date of Patent: Feb. 14, 2012

(54) METHOD AND APPARATUS FOR HIGH-SPEED AND LOW-COMPLEXITY PIECEWISE GEOMETRIC TRANSFORMATION OF SIGNALS

(75) Inventors: Mohammed Shoaib, Princeton, NJ (US); Guotong Feng, Mountain View, CA (US); M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 12/706,648

(22) Filed: Feb. 16, 2010

(65) Prior Publication Data

US 2011/0200271 A1    Aug. 18, 2011

(51) Int. Cl.
 *G06K 9/36*    (2006.01)
(52) U.S. Cl. .................. 382/276; 358/453; 345/628
(58) Field of Classification Search .......... 382/100, 382/276–304; 358/208.4, 241, 273, 281, 358/453; 345/620–628
See application file for complete search history.

(56) References Cited

U.S. PATENT DOCUMENTS

| | | | | |
|---|---|---|---|---|
| 5,369,735 | A * | 11/1994 | Thier et al. | 345/423 |
| 5,424,742 | A | 6/1995 | Long et al. | |
| 5,592,599 | A * | 1/1997 | Lindholm | 345/427 |
| 5,598,488 | A | 1/1997 | Poggio et al. | |
| 5,748,192 | A * | 5/1998 | Lindholm | 345/649 |
| 5,995,677 | A * | 11/1999 | Jones | 382/276 |
| 6,172,670 | B1 | 1/2001 | Oka et al. | |
| 6,445,182 | B1 | 9/2002 | Dean et al. | |
| 6,538,691 | B1 | 3/2003 | Macy et al. | |
| 6,556,193 | B1 | 4/2003 | Auld et al. | |
| 7,177,486 | B2 * | 2/2007 | Stewart et al. | 382/294 |
| 2006/0159308 | A1 * | 7/2006 | Hampapur et al. | 382/103 |
| 2006/0280376 | A1 | 12/2006 | Lei | |
| 2007/0211960 | A1 | 9/2007 | Sasaki et al. | |
| 2008/0298678 | A1 | 12/2008 | Kang | |
| 2010/0322530 | A1 | 12/2010 | Feng et al. | |

OTHER PUBLICATIONS

Shoaib, Mohammed, et al., "Parallel Architectures for Piecewise Geometric Signal Transformations," Ricoh Innovations, Inc, Sand Hill Road, Menlo Park, CA 94025, 14 pages.
Musin, Oleg R., "Fast Geometric Transformations for Image Processing," International Journal of Imaging Systems and Technology, vol. 3, No. 3, 2005, Mar. 14, 1991, CCC 0899-9457/91/030257-05, pp. 257-261.
Qiang, L et al, "FPGA Implementation of Pipelined Architecture for Optical Imaging Distortion Correction," Proceedings of the IEEE Workshop on Signal Processing Systems Design and Implementation (SIPS) 2006, Oct. 2006, pp. 182-187.

(Continued)

*Primary Examiner* — Anand Bhatnagar
(74) *Attorney, Agent, or Firm* — Blakely, Sokoloff, Taylor & Zafman LLP

(57) ABSTRACT

A method and system for high-speed and low-complexity geometric transformation of signals are described. In one embodiment, the system comprises an input patch consisting of a window of pixels from an input image. The system may further comprise a transformation selector to generate control data to control a geometric transformation mapping based on the location of a current pixel being processed. In one embodiment, the system may also comprise a hardware geometric transform engine to perform a geometric transformation mapping by switching on one path through the geometric transform engine from an input window to an output pixel using the control data. In one embodiment, the system may further comprise an interpolator to generate interpolated geometric transformation mappings using the control data and multiple outputs from the geometric transform engine by switching on multiple paths from an input window.

17 Claims, 10 Drawing Sheets

OTHER PUBLICATIONS

Kung. M.C., et al., "Block Based Parallel Motion Estimation Using Programmable Graphics Hardware," Proceedings of the International Conference on Audio, Language and Image Processing (ICALIP 2008), IEEE, Jul. 7-9, 2008, pp. 599-603.

Takayuki, Y., et al., "A Lateral Chromatic Aberration Correction System for Ultrahigh-Definition Color Video Camera," in *Sensors, Cameras, and Systems, for Scientific and Industrial Applications, VII Proceedings of SPIE,*" vol. 6068, SPIE Press, Bellingham, WA, 2006, 8 pages.

Boult, T.E., et al., "Correcting Chromatic Aberrations Using Image Warping," in *IEEE Computer Society Conference on Computer Vision and Pattern Recognition Proceedings CVPR, 1992*" IEEE Computer Society 2008, IEEE Press, Jun. 15-18, 1992, pp. 684-687.

Cai, Y., et al., "Color Correction for Digital Images Based on the Finite—Dimensional Linear-Model," in *International Conference on Computer Science and Software Engineering,*" IEEE Computer Society, Dec. 12-14, 2008, pp. 313-317.

Weng, J., et al., "Camera Calibration with Distortion Models and Accuracy Evaluation," *IEEE Transactions on Pattern Analysis and Machine Intelligence,* vol. 14, Issue 10, Oct. 1992, pp. 965-980.

Shah, S., et al., "A Simple Calibration Procedure for Fish-Eye (High Distortion) Lens Camera," in Proceedings of the 1994 IEEE international Conference on Robotics and Automation, vol. 4, IEEE 1994, May 8-13, 19994, pp. 3422-3427.

Nomura, Shihiko, et al., "Simple Calibration Algorithm for High-Distortion Lens Camera," IEEE Transactions on Pattern Analysis and Machine Intelligence vol. 14, No, 11, Nov. 1992, pp. 1095-1099.

Asahi, K. V., et al, "A New Approach for Non-Linear Distortion Correction in Endoscopic Images Based on Least Squares Estimation," IEEE Transactions on Medical Imaging vol. 18, Apr. 1999, pp. 345-354.

Heikkila, J., et al., "A Four-Step Camera Calibration Procedure with Implicit Image Correction," in *"CVPR 97: Proceedings of the 1997 Conference on Computer Vision and Pattern Recognition (CVPR '97),"* IEEE Computer Society, Jun. 17-19, 1997. p. 1106-1112.

Hartley, R.I., et al., "Parameter-Free Radial Distortion Correction with Centre of Distortion Estimation," in *"ICCV '05: Proceedings of the Tenth IEEE International Conference on Computer Vision,"* IEEE Computer Society 2005, Washington, D.C., USA, Oct. 17-21, 2005 pp. 1834-1841.

Mathwork Matlab's, "Camera Calibration Toolbox for Matlab," at http//www.vision.caltech.edu/bouguetj/calib_doc/index.html, Jun. 2, 2008, 4 pages.

Zhang, Z., "Flexible Camera Calibration by Viewing a Plane from Unknown Orientations," in ICCV '99: Proceedings of the IEEE International Conference on Computer Vision, Sep. 20-27, 1999, pp. 666-673.

\* cited by examiner

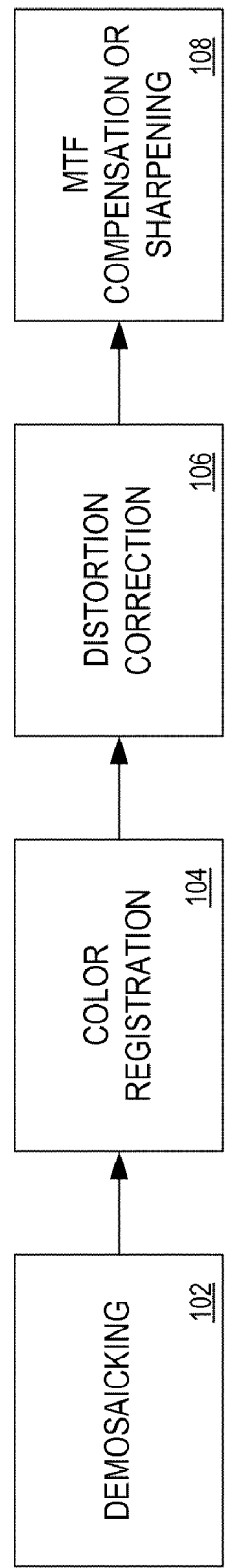

METHOD AND APPARATUS FOR HIGH-SPEED AND LOW-COMPLEXITY PIECEWISE GEOMETRIC TRANSFORMATION OF SIGNALS

FIELD OF THE INVENTION

The present invention relates to the field of electro-optical imaging systems; more particularly, the present invention relates to high-speed and low-complexity geometric transformation of signals.

BACKGROUND OF THE INVENTION

A variety of signal processing applications require geometric transformations of image data to correct for distortions introduced into image data by an optical system. Such geometric transformations generally include reordering signal data in space to correct for the distortions. Current solutions for distortion correction utilize serial data processing in software to transform pixel data. Each pixel in an image is modified based on a specific geometric transformation, and stored in an output memory buffer. After all pixels in the image have been processed, the corrected image may be outputted from the memory buffer. This technique creates a sequential bottleneck in image processing at the memory buffer and therefore fails to provide high-speed and real-time performance for image correction.

For example, U.S. Pat. No. 6,538,691, entitled "Software Correction of Image Distortion in Digital Cameras," provides a method for using a polynomial model for image distortion correction. The computations for transforming pixel positions are performed using a software application, which outputs transformed pixels to a memory buffer with a modified location calculated using a polynomial model. Such software based techniques for processing pixel data involve a relatively high level of computation complexity, and associated expense, to perform the image processing operations.

In Linear Shift Invariant (LSI) upstream processing, chromatic aberration correction (CAC) has traditionally been handled by the design of high-end achromatic lenses. These geometric distortions are many times focus dependent and their correction needs a complex remapping interpolation. A number of software solutions address the simple types of distortions quite successfully. One such technique involves pre-calibrating the color channels for optimal focus, magnification, and shift. However, producing an aberration free image requires taking three separate images.

When the distortion is more complex, varies with focus, and depends on the color plane, hardware complexity necessitates the use of special lenses, which inevitably increases system costs. Y. Takayuki et al., "A Lateral Chromatic Aberration Correction System for Ultrahigh-Definition Color Video Camera," *Sensors, Cameras and Systems for Scientific and Industrial Applications VII: Proceedings of SPIE* (Vol. 6068, SPIE Press, 2006) proposes a Lateral Chromatic Aberration Correction (LCAC) system which includes a real time signal processing configuration stored in memory stacks for variable camera focus settings. Other techniques include image warping using cubic splines and finite dimensional linear modeling, as proposed in Boult and Wolberg "Correcting Chromatic Aberrations Using Image Warping," *IEEE Computer Society Conference on Computer Vision and Pattern Recognition, Proceedings CVPR* 1992 (IEEE Computer Society, 2008) and Cai et al. "Color Correction for Digital Images based on the Finite Dimensional Linear-Model," *International Conference on Computer Science an Software Engineering* (IEEE Computer Society, 2008) respectively. However, in practice, each of these have severe realization complexities. The difficulty in mapping these complex methods to dedicated hardware limits their use.

Weng et al. "Camera Calibration with Distortion Models and Accuracy Evaluation," *IEEE Transactions on Pattern Analysis and Machine Intelligence* (1992) provides an overview of Geometric Distortion Correction (GDC) methods, as well as an evaluation of the error induced by each of the interpolation methods. A normalized stereo calibration error model for compensating the geometric artifacts is introduced. Other linear and nonlinear methods have been developed to tackle distortion correction and include improvements over the basic methods described in Weng. However, as discussed above, none of these approaches consider a hardware mapping cost associated with the corresponding methods.

Besides the CAC and GDC approaches discussed above, there have also been design attempts that involve complexity and/or accuracy tradeoffs. Software methods for GDC include Heikkila and Silven, "A Four-Step Camera Calibration Procedure with Implicit Image Correction," *CVPR '97 Proceedings of the 1997 Conference on Computer Vision and Pattern Recognition* (IEEE Computer Society, 1997) and Hartley and Kang, "Parameter Free Radial Distortion Correction with Centre of Distortion Estimation," *ICCV 05: Proceedings of the Tenth IEEE International Conference on Computer Vision* (IEEE Computer Society, 2005). Heikkila and Silven propose a radial distortion correction model based on a set of coefficients for camera calibration. Linear and non-linear models are outlined using the Mathwork Matlab's Camera Calibration Toolbox. Hartley and Kang propose a similar distortion correction model. However, they account only for tangential distortion by using a distortion calibration grid captured in several images. U.S. Patent Pub. No. 2006/0280376, entitled "Method for Geometry Distortion Correction," proposes a technique where an image is predistorted in order to compensate for the distortions which would occur later. This is a pre-processing technique where the image is intentionally distorted before the processing step.

SUMMARY OF THE INVENTION

A method and system for high-speed and low-complexity geometric transformation of signals are described. In one embodiment, the system comprises an input patch consisting of a window of pixels from an input image. The system may further comprise a transformation selector to generate control data to control a geometric transformation mapping based on the location of a current pixel being processed. In one embodiment, the system may also comprise a hardware geometric transform engine to perform a geometric transformation mapping by switching on one path through the geometric transform engine from an input window to an output pixel using the control data. In one embodiment, the system may further comprise an interpolator to generate interpolated geometric transformation mapping using the control data and multiple outputs from the geometric transform engine by switching on multiple paths from an input window.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A illustrates one embodiment of an image signal processing (ISP) pipeline.

DETAILED DESCRIPTION OF THE PRESENT INVENTION

Figure 1B:
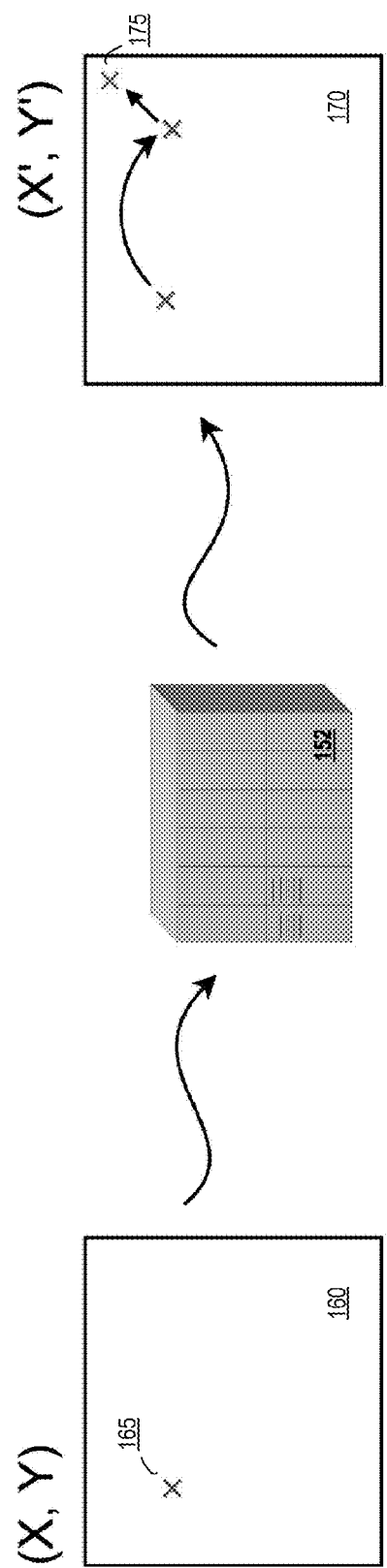
FIG. 1B illustrates one embodiment of a geometric transformation system for two-dimensional image data.

A method and system for high-speed and low-complexity geometric transformation of signals are described. In one embodiment, the system comprises an input patch consisting of a window of pixels from the input image. The system may further comprise a transformation selector to generate control data to control a geometric transformation mapping based on the location of a current pixel being processed. In one embodiment, the system may also comprise a hardware geometric transform engine to perform a geometric transformation mapping by switching on one path through the geometric transform engine from an input window to an output pixel using the control data. In one embodiment, the system may further comprise an interpolator to generate interpolated geometric transformation mapping using the control data and multiple outputs from the geometric transform engine by switching on multiple paths from an input window.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representation of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In general, geometric transformations can be represented as:

$$I_{out}(t)=I_{in}(t-D(t)) \quad (1)$$

where $I_{in}$ and $I_{out}$ are the input and output signals, t the coordinate vector in the n-dimensional space, and D(t) the geometric shift vector for the coordinate vector t. This model defines the geometric mapping between the input and output signal locations. Thus, geometric transformations in a 2-D imaging systems, such as transformation for distortion correction and chromatic aberration correction, can be expressed as:

$$I_{out}(x,y)=I_{in}(x-D_x(x,y),y-D_y(x,y)) \quad (2)$$

where (x, y) is the coordinates of the current signal being processed, $D_x(x, y)$ and $D_y(x, y)$ the transformation maps for the x and y dimensions, respectively. In theory, this is the ideal transformation model that can be achieved. In practice, however, this transformation model may require expensive computational resources in hardware and/or software.

FIG. 1A illustrates one embodiment of an image signal processing (ISP) pipeline. In one embodiment the ISP pipeline illustrated in FIG. 1 is a subset of components of a typical ISP pipeline that may be utilized for processing an image. In one embodiment, Demosaicking 102 and Modulation Transfer Function (MTF) Compensation or Sharpening 108 are computational transformation units in the ISP pipeline. In one embodiment, Color Registration 104 and Distortion Correction 106 are geometric transformation units in the ISP pipeline. In one embodiment, each of the units may be implemented in hardware, software, or a combination of both.

In one embodiment, as will be discussed below, Distortion Correction 106 is a hardware based geometric transformation engine implemented in a low-complexity, high-speed array of multiplexers to transform signals (e.g., image data). In one embodiment, the interconnections between the multiplexers is predefined by a constant piecewise geometric transformation of an input window of pixels optimized for a particular application, optical lens, type of distortion, etc. In one embodiment, Distortion Correction 106 is configured to process pixel data serially and in real-time or near real-time.

FIG. 1B illustrates one embodiment of a geometric transformation system for two-dimensional image data. In one embodiment, the system 152 includes the Distortion Correction 156 unit illustrated in FIG. 1A. In one embodiment, system 152 transforms a pixel 165 from its current position in an input image 160 to a modified pixel position 175 in an output image 170. In one embodiment, the geometric transformation performed by system 152 is based on a computational equation, discussed in greater detail below. In one embodiment, pixels arrive at the system 152 in a raster order and processed by a displacement transformation executed by system 152. In one embodiment, the transformation may involve a rotation of the pixel coordinate vector followed by a translation. The geometric transformation of FIG. 1B is illustrated with respect to the XY plane for two-dimensional image data. However, the systems and methods discussed herein may be utilized in three-dimensional imaging systems, as well as other applications discussed herein.

In one embodiment, the system 152 computes pixel location mapping based on a continuous functional model. Conventional implementations of a geometric transformation engine are sequential and therefore suffer from a large time complexity and implementation bottlenecks. In one embodiment, system 152 is hardware-based to reduce the complexity and increase the efficiency of geometric transformations performed by the system 152. In one embodiment, a two-dimensional geometric transformation model in this scenario can be approximated using a quantized transformation model, which can be expressed as:

$$\hat{D}_{x(y)}(x,y) = Q(D_{x(y)}(x,y)) \tag{3}$$

where Q is a quantization model defined for a finite set of reference region tiles that divide an image. In one embodiment, the finite set of region tiles can be polar tiles. In another embodiment, the finite set of reference tiles may be arbitrarily shaped tiles separated by linear boundaries. In one embodiment, the number and linear boundaries of arbitrarily shaped tiles is optimized under minimum mean square error (MSE) criterion.

In one embodiment, the design of a low-cost and high-speed hardware solution involves identifying the best tradeoffs between accuracy and complexity for the targeted geometric transformation. In one embodiment, a quantized geometric transformation, such as that which would be performed by system 152 of FIG. 1B, could be implemented using a general purpose processor (CPU), a digital signal processor (DSP), or a custom hardware and logic in an image signal processing (ISP) pipeline.

Distortion Correction

Two-dimensional geometric image distortion correction for an optical system is discussed in detail below. However, the discussion is provided as an example use of the present invention. The techniques, hardware systems, and methods discussed herein may also be applied to three-dimensional imagining systems and other image artifact correction processes (e.g., chromatic aberration correction).

Distortion is a typical aberration in many optical systems, where image magnification varies with field location due to intrinsic lens characteristics of the optical system.

Figure 2B:
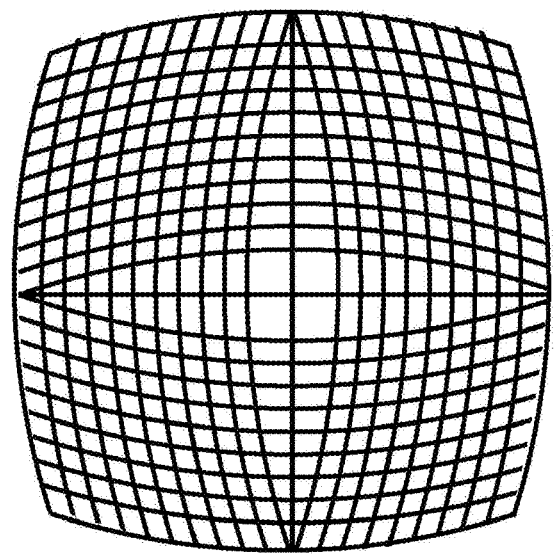
FIGS. 2A-2B illustrate distortion patterns of image data.
Figure 2A:
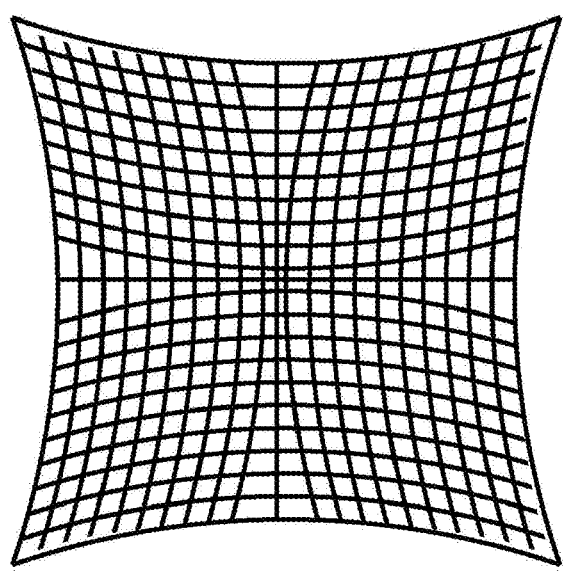

Although distortion can be irregular or follows many patterns, the most commonly encountered distortions are radially symmetric distortion patterns arising from the symmetry of an optical lens. Radial distortion can usually be classified as one of two main types. Pincushion distortion of image data is illustrated in FIG. 2A and barrel distortion is illustrated in FIG. 2B. Barrel distortion and pincushion distortion occur where image magnification decreases and increases with distance from the optical axis, separately. In one embodiment, barrel and pincushion distortion patterns can be corrected in a geometric transformation module of an ISP system based on a distortion model.

Distortion Model for Image Correction

In one embodiment, the distortion correction model function for a two-dimensional optical system can be expressed as:

$$D_x(x, y) = \sum_{p=0}^{N_x} \sum_{q=0}^{N_x-p} c_{pq} x^p y^q \tag{4}$$

$$D_y(x, y) = \sum_{p=0}^{N_y} \sum_{q=0}^{N_y-p} d_{pq} x^p y^q$$

where (x, y) is the coordinates of the current signal being processed, $D_x(x, y)$ and $D_y(x, y)$ the polynomial geometric transformation functions for the x and y dimensions, respectively, $c_{pq}$ and $d_{pq}$ the coefficients of the polynomials, $N_x$ and $N_y$ the degrees (or orders) of the polynomials, and p and q the degrees of the polynomial terms. In one embodiment, the polynomial functions in (4) can be directly computed in hardware using multiplications and additions. However, the complexity of this embodiment may be increasingly high as the total number of the polynomial terms gets large. In one embodiment, a polynomial function can be computed using the forward difference operators, which are defined as:

$$\Delta f_n = f_{n+1} - f_n$$

$$\Delta^k f_n = \Delta^{k-1} f_{n+1} - \Delta^{k-1} f_n \tag{5}$$

where $f_n$ is the value of function $f$ at the $n^{th}$ point, $\Delta f_n$ the $1^{st}$ order forward difference of the function at the $n^{th}$ point, and $\Delta^k f_n$ the $k^{th}$ order forward difference of the function at the $n^{th}$ point. If $f$ is a polynomial function where N is the degree of the function, then only the forward differences of the $N^{th}$ order or lower have non-zero values. Thus, given the forward differences of the first point, the polynomial function at each of the following points can be computed iteratively using a finite number of forward difference operators. This process can be expressed as:

$$f_{n+1} = f_n + \Delta f_n$$

$$\Delta^{k-1} f_{n+1} = \Delta^{k-1} f_n + \Delta^k f_n \tag{6}$$

where k=1, 2, ... N. As such, the forward difference operators of polynomial functions require only a finite number of additions at each point, therefore enabling low-complexity hardware implementation.

In one embodiment for the two-dimensional polynomial functions in (4), the forward difference operations can be computed along the X and Y dimensions separately. In particular, let $(x_0, y_0)$ be the location of the first pixel at the top left corner of the raster image. To obtain each point of $D_x(x,y)$ in the raster order, the forward difference operations are computed horizontally row by row. For the $m^{th}$ row, this can be expressed as:

$$D_x(x_{n+1},y_m) = D_x(x_n,y_m) + \Delta D_x(x_n,y_m)$$

$$\Delta^{k-1}D_x(x_{n+1},y_m) = \Delta^{k-1}D_x(x_n,y_m) + \Delta^k D_x(x_n,y_m) \quad (7)$$

where $k=1, 2, \ldots N_x$, and n is the index of the column being processed. Meanwhile, to obtain the initial forward differences $\Delta^k D_x(x_0, y_m)$, the forward differences are computed vertically for the first $N_x+1$ columns, which can be expressed as:

$$D_x(x_i,y_{m+1}) = D_x(x_i,y_m) + \Delta D_x(x_i,y_m)$$

$$\Delta^{k-1}D_x(x_i,y_{m+1}) = \Delta^{k-1}D_x(x_i,y_m) + \Delta^k D_x(x_i,y_m) \quad (8)$$

where $i=0, 1, 2, \ldots N_x$, and m is the index of the row being processed. Similarly, the forward difference operations described above can be used to compute $D_y(x,y)$.

In one embodiment, $D_x(x,y)$ and $D_y(x,y)$ can be approximated using piecewise polynomial functions in a finite set of rectangular tiles. In such case, the forward difference operations described above can be used to compute for each tile region separately.

Figure 3:
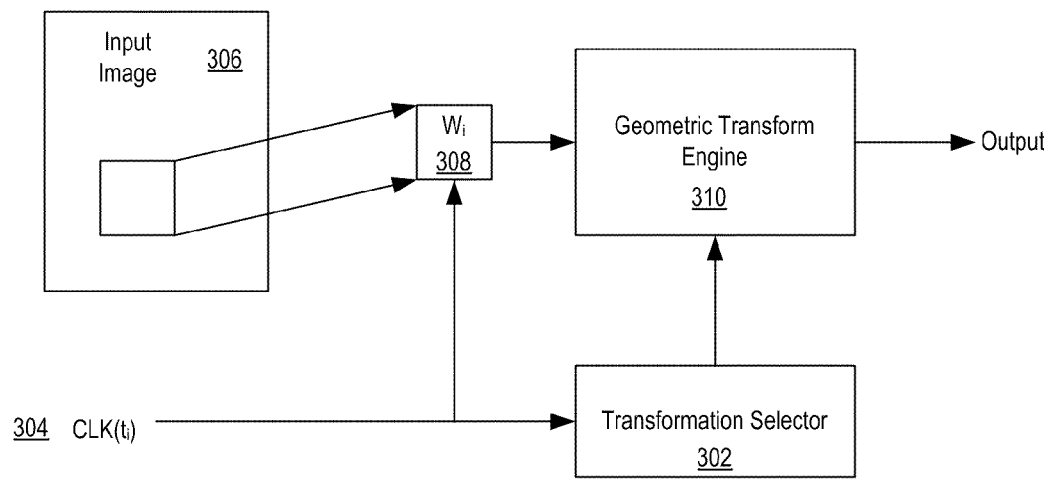
FIG. 3 illustrates on embodiment of a system for performing geometric transformations in parallel based on a sampling period.

FIG. 3 illustrates one embodiment of a system for performing geometric transformations in parallel. At each system clock, a pixel window is obtained from input image 306, and supplied to a geometric transformation engine 310. In one embodiment, a system clock 304 also provides timing data to dynamic transformation selector 302. Dynamic transformation selector 302 in turn utilizes timing data, to generate a set of control signals. In one embodiment, the control signals are control bits that dynamically configure a geometric transformation engine (GTE) to perform the selected geometric transformation corresponding to the pixel window. As will be discussed below, in one embodiment, the geometric transformation engine includes a network of multiplexers to efficiently perform the desired geometric transformations. One system for generating and utilizing control bits for controlling a multiplexer array is discussed in U.S. patent application Ser. No. 12/488,479, filed June 2009, entitled "Method and Apparatus for FIR Filtering Using Space-Varying Rotation."

Geometric Transformation Engine (GTE)

Figure 4A:
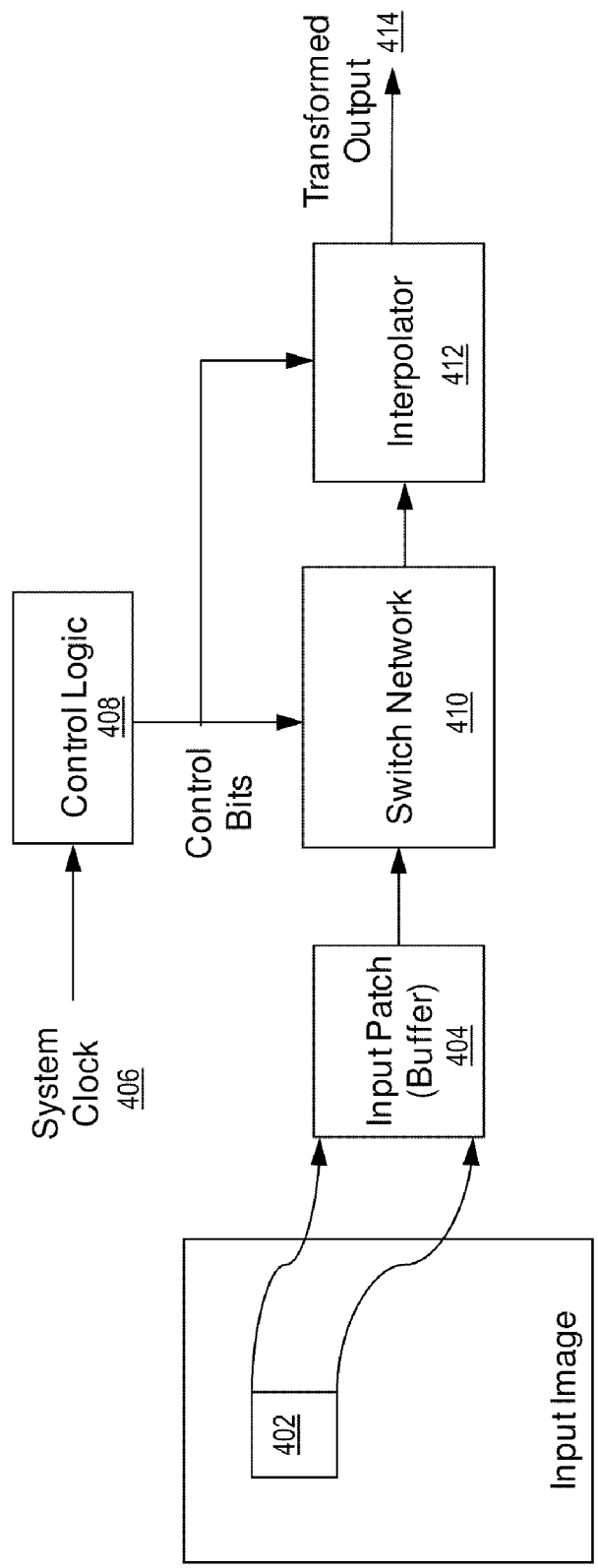
FIG. 4A illustrates one embodiment of a system for performing geometric transformations on image data.

FIG. 4A illustrates one embodiment of a system for performing geometric transformations on image data.

In one embodiment, with respect to FIG. 4A, the geometric transformation system includes an input patch buffer 404 to receive a window of pixels 402 from in input image. In one embodiment, pixel data to be transformed is received by the input patch buffer 404 in a raster order. In one embodiment, based on a value received from the system clock 406 and a location of the window of pixels 402 (i.e., the locus of a reference tile within the input image), control logic 408 generates a set of control bits, which it provides to switch network 410. In one embodiment, the control bits are referred to as a transformation index because the bits configure the switch network 410 to perform a desired transformation. One system for generating and utilizing control bits for controlling a multiplexer array is discussed in U.S. patent application Ser. No. 12/488,479, filed June 2009, entitled "Method and Apparatus for FIR Filtering Using Space-Varying Rotation."

In one embodiment, switch network 410 performs one or more geometric transformations on the image data of the window of pixels 402 based on a quantization model derived for a set of reference region tiles of an image. In one embodiment, the quantization model is derived and optimized for a particular application and/or image distortion to be corrected prior to receipt of image data. In one embodiment, the switch network 410 outputs the image data to interpolator 412. In one embodiment, the interpolator 412 generates interpolated pixel data as a final transformed output 414.

Figure 4B:
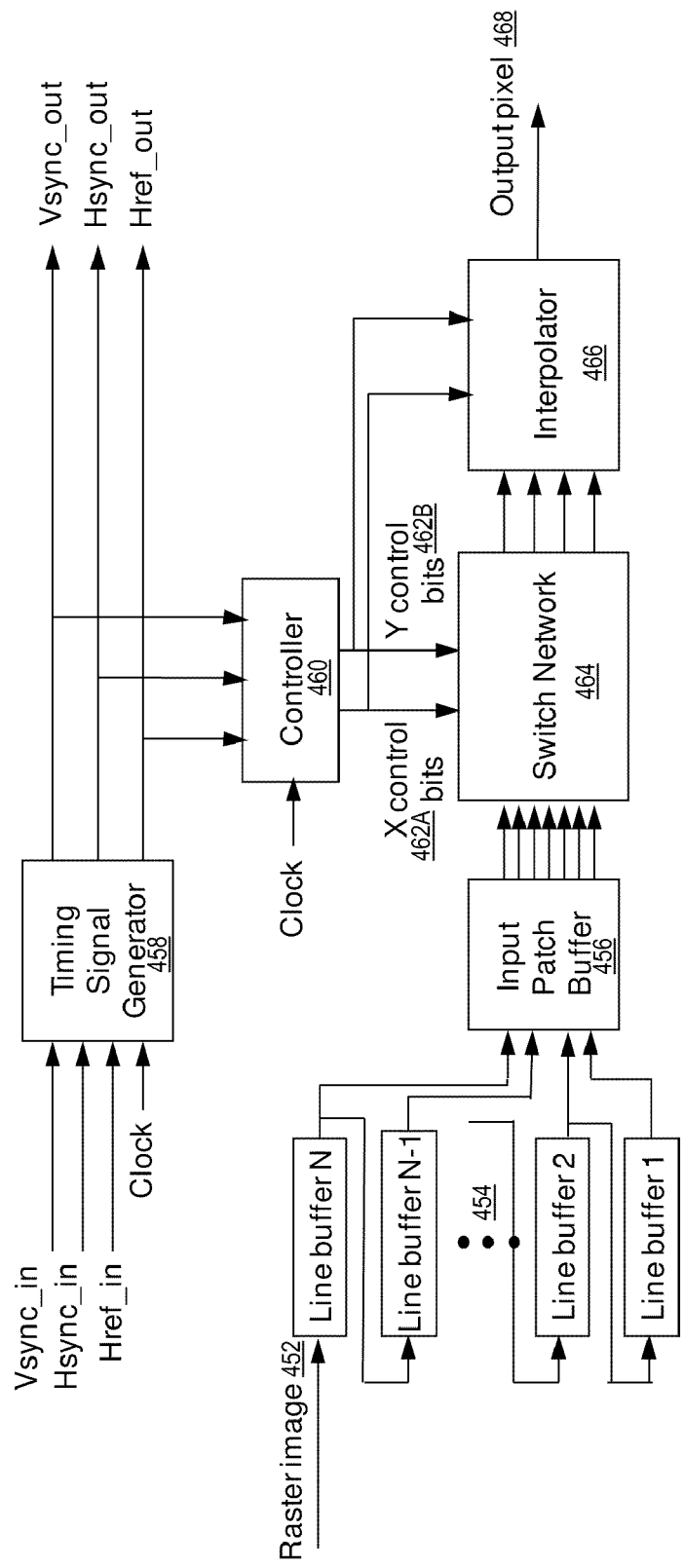
FIG. 4B illustrates another embodiment of a system for performing geometric transformations on image data.

FIG. 4B illustrates another embodiment of a system for performing geometric transformations on image data. In one embodiment, the system illustrated in FIG. 4B provides additional details of the system of FIG. 4A discussed above. In one embodiment, line buffers 454 store an input raster image 452 in sequence. In one embodiment, input patch buffer 456 stores an input patch of image data by taking a window of pixels of the raster image 452 from the line buffers 454.

In one embodiment, at each pixel clock, the timing signal generator module 458 creates output timing signals based on the input timing signals and the system processing delay. The output timing signals are further used by the controller module 460 to generate control bits 462A and 462B for the X and Y dimensions separately based on the distortion model described in greater detail above. In one embodiment, the X and Y control bits 462A and 462B are then used to switch on one or multiple paths through the switch network module 464 from the input patch buffer 456.

In one embodiment, the output pixels of the switch network module 464 and the X and Y control bits 462A and 462B are then used by the interpolator module 466 to generate an interpolated pixel as the final transformed output 468. In one embodiment, the interpolator module 466 performs bilinear interpolation based on the input pixels. In one embodiment, the X and Y control bits 462A and 462B are used to determine the coefficients of the bilinear interpolator for both X and Y dimensions.

Figure 5:
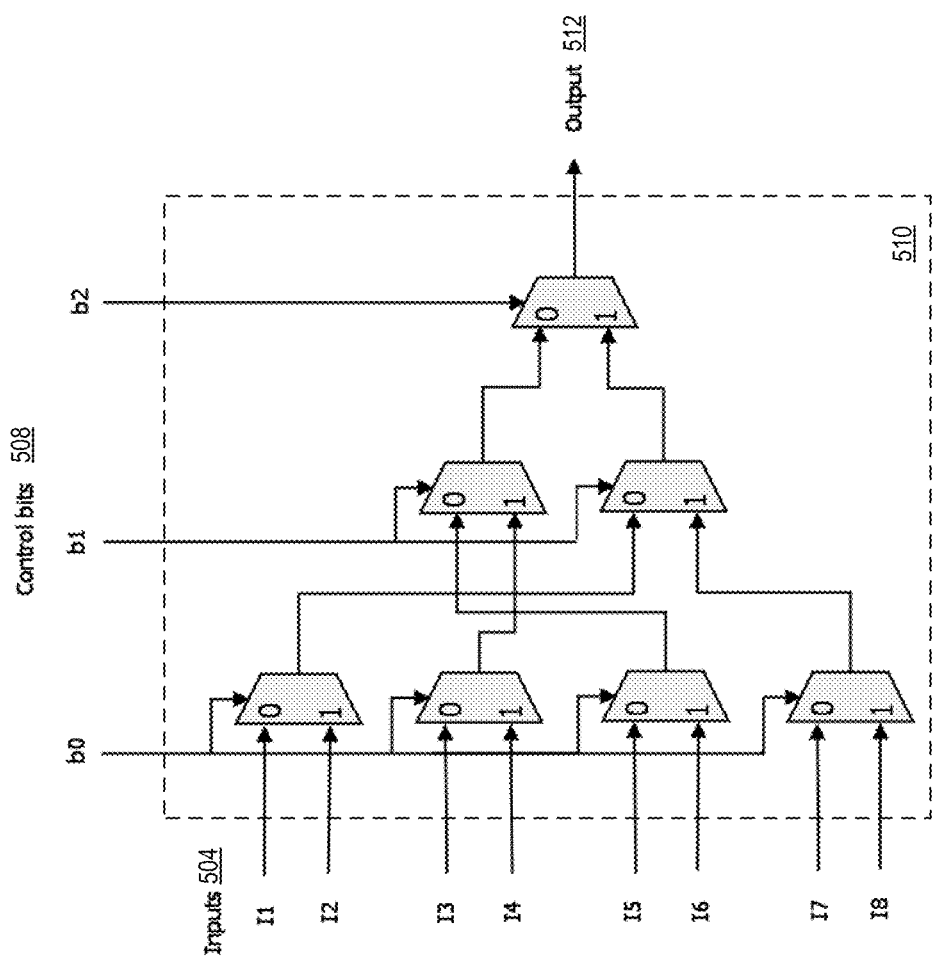
FIG. 5 illustrates one embodiment of a geometric transformation engine.

FIG. 5 illustrates one embodiment of a geometric transformation engine. In one embodiment, the geometric transformation engine includes a switch network 510. In one embodiment, the switch network 510 may be utilized by the system illustrated in FIG. 4.

In one embodiment, switch network 510 comprises an array of multiplexers for transforming input image data 504 according to a set of control bits 508. In one embodiment, the switch network 510 is configured based on a quantization model that has been derived for a set of reference region tiles for input images. Although switch network 510 is illustrated with seven multiplexers, more or less multiplexers may be included in a switch network according to an input size and/or a geometric transformation to be performed by the switch network. In one embodiment, then after the switch network 510 transforms the image data, the transformed image data is outputted 512.

Exemplary Applications

The application domain of the embodiments for geometric transformations is very broad. The above discussion focused on a specific two dimensional system for distortion correction, to avoid obscuring the present invention. However, other image processing applications may benefit from quantized parallel processing of image data and realize substantial computational savings.

Figure 6:
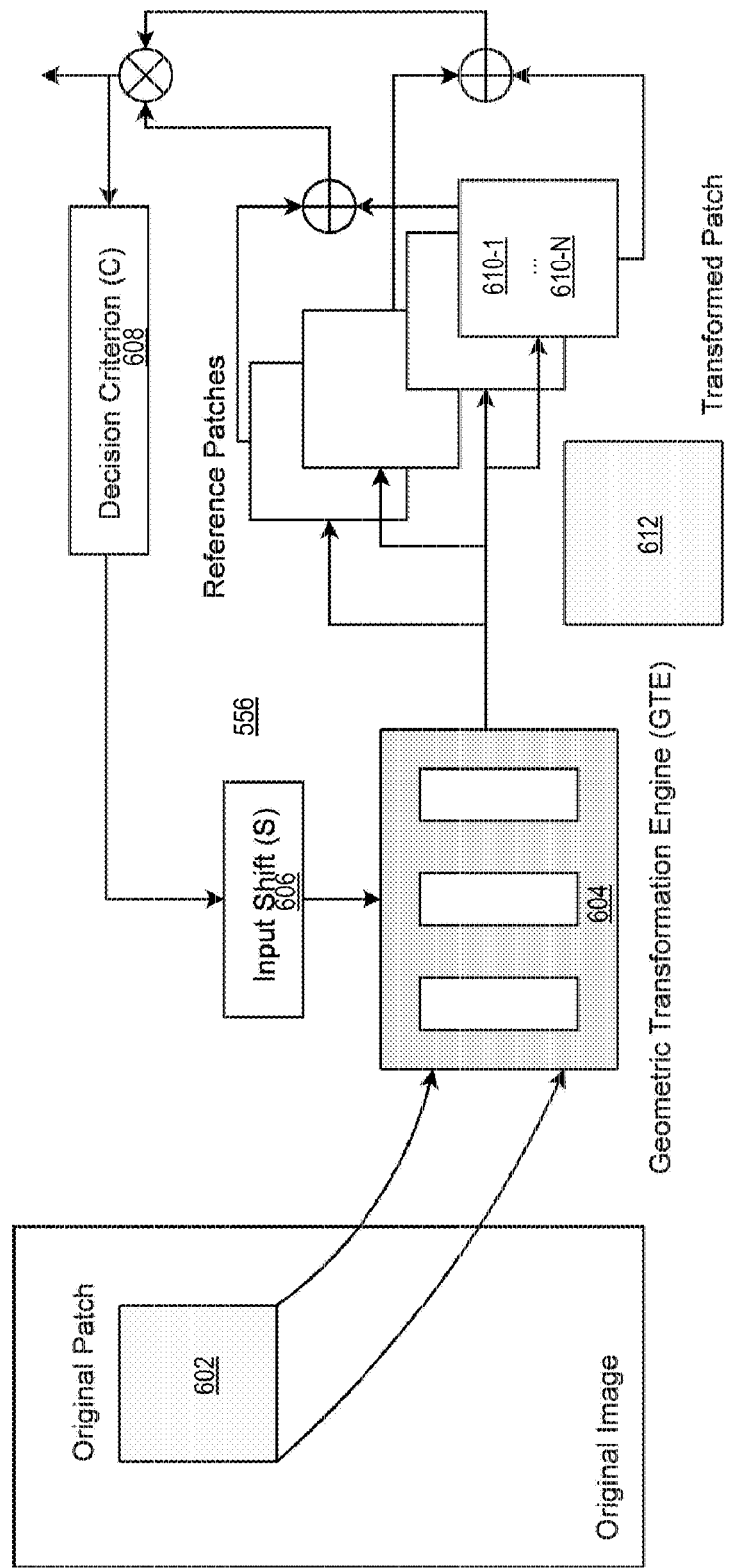
FIG. 6 illustrates one embodiment of a system that utilizes parallel data processing for image patch registration.

FIG. 6 illustrates one embodiment of a system that utilizes parallel data processing for image patch registration. In one embodiment, image patch registration is utilized for block based motion estimation. Feedback from comparison of image patches controls reference object transformations. In one embodiment, system 600 is a transformational feedback system that modifies a geometric transformation performed by GTE 604 to generate a new transformed image.

In one embodiment, the modification of the geometric transformation is based on feedback from a decision criterion 608 for motion estimation. In one embodiment, comparison of an input patch 602 is performed against a plurality of reference patches 610-1 through 610-N in parallel, as discussed above. In one embodiment, results of the comparison are processed by decision criterion 608 in order to update a geometric transformation performed by GTE 604. In one embodiment, input shift 606 generates control signals that modify the geometric transformation to be applied by GTE 604 on image data. Because GTE 604 processes geometric transformations of a window of pixels corresponding to the image patch, instead of serially one pixel at a time, the efficiency of the block based motion estimation processes is increased substantially.

Figure 7:
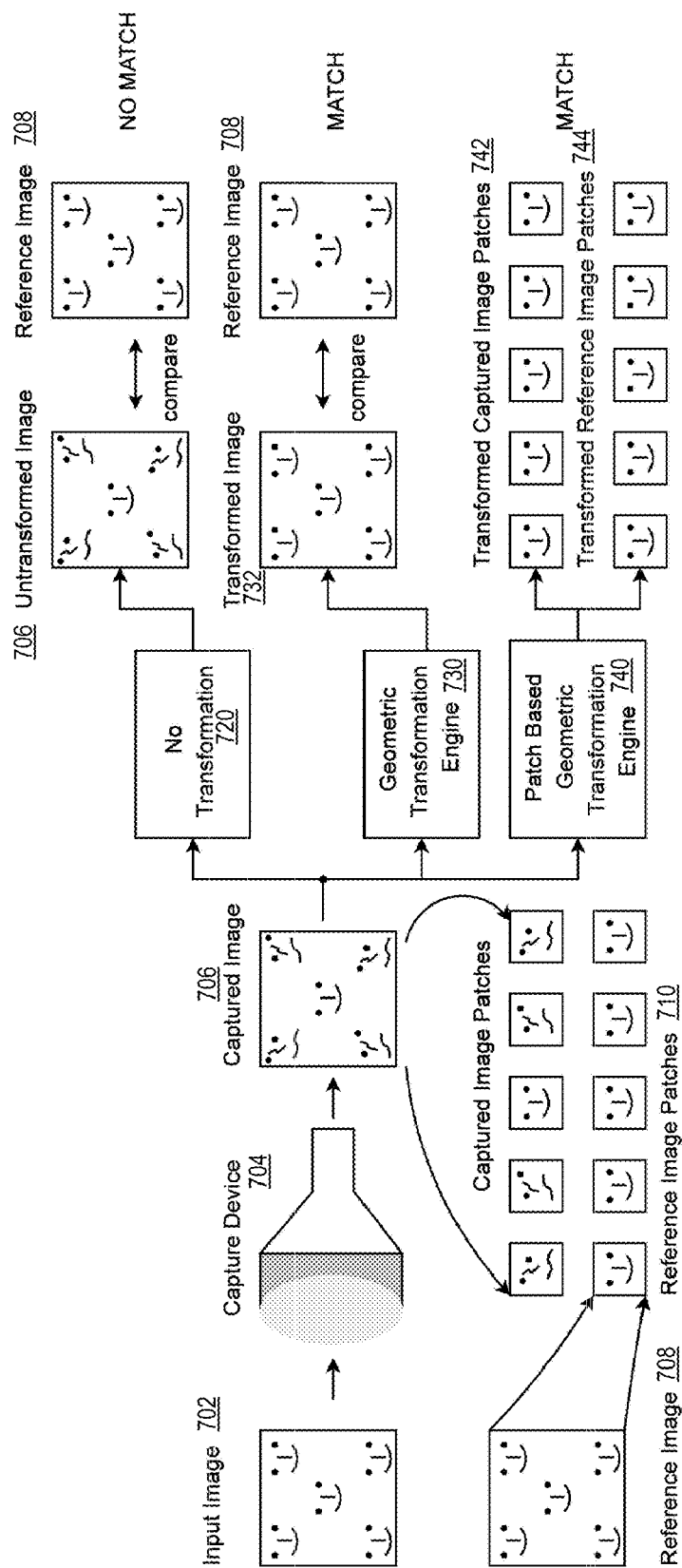
FIG. 7 illustrates one embodiment of a system that utilizes parallel data processing for pattern matching.

FIG. 7 illustrates one embodiment of a system that utilizes parallel data processing for pattern matching. In one embodiment, a system for pattern matching may be applied in, for example, face recognition applications. In one embodiment, an input image 702 captured by a digital camera 704 is distorted due to optical limitations of the digital camera 704. In one embodiment, the captured and distorted image 706 is to be compared with a reference image 708.

In a system that utilizes no geometric transformations 720, comparison of the captured image 706 with the reference image 708 results in a mismatch in the comparison algorithm. Because the captured image 706 is distorted, even when a match with the input image 702 exists within the reference images including the reference image 708, no positive image match if found.

In a system that utilizes serial image transformation techniques, the distorted image 706 is sequentially transformed by geometric transformation engine 730 and is stored in memory (not shown) before comparison of a transformed image 732 with the reference imager 708. In one embodiment, this approach could utilize quantization approximations but the implementation of the model would also utilize sequential processing techniques on each pixel (similar to techniques performed by conventional digital signal processors or a CPUs). The corrected, stored image 732 is then compared with a reference image 708 and results in a match.

In one embodiment, parallel processing of image data is utilized with a piecewise constant approximation on a single computation axis. A patch of the captured image 742 is transformed by the patch based geometric transformation engine 740, utilizing the techniques discussed above, and compared with a patch of the reference image 744 to produce a comparison result. The computational resources required for comparing a smaller patch are lower than that for comparison of whole images. Furthermore, the patches may be processed in parallel resulting in a higher throughput of image comparisons in a pattern matching system. Furthermore, the same parallel patch hardware can be reused for processing the entire image, rather than patch wise processing.

Exemplary Computer System

Figure 8:
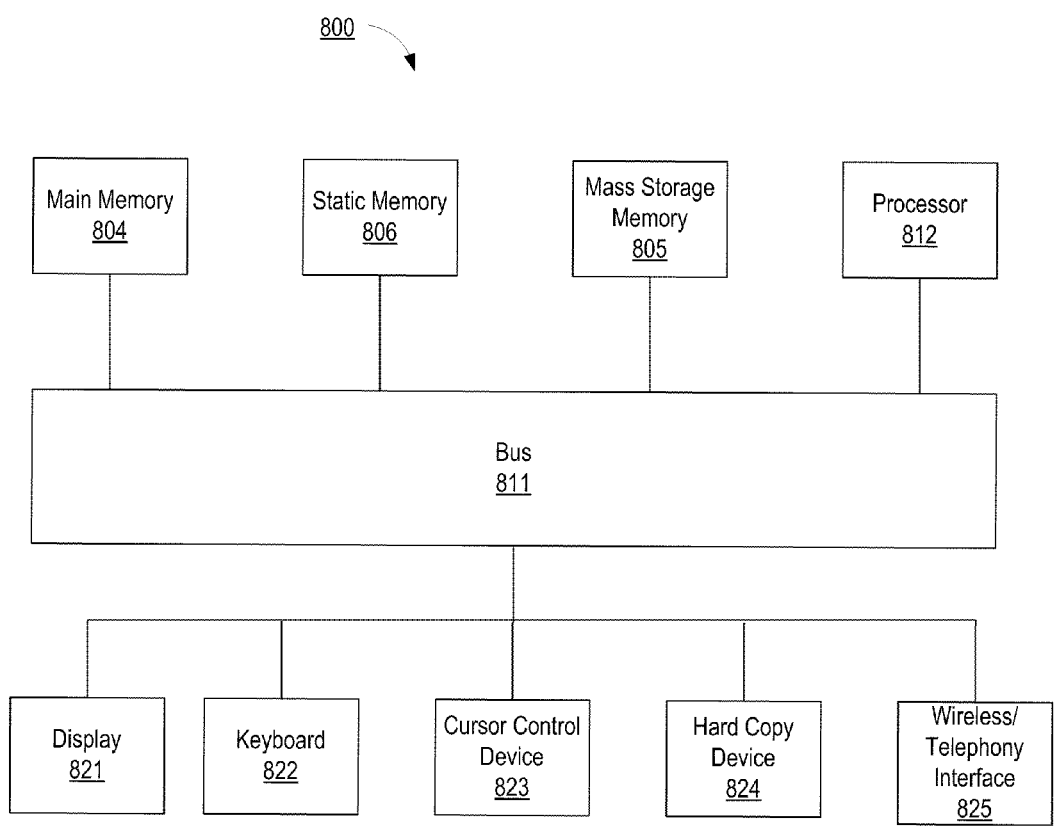
FIG. 8 is a block diagram of a computer system.

FIG. 8 is a block diagram of a computer system that may perform one or more of the operations described herein. In one embodiment, one or more components of the computer system may be integrated into an optical imaging system. In another embodiment, the computer system may control an optical imaging system. Referring to FIG. 8, computer system 800 may comprise an exemplary client or a server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812. Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, track ball, track pad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system, comprising:
   an input patch to receive a window of pixels of an input image, wherein the window of pixels includes a fixed set of neighboring pixels around a current pixel, wherein a size of the window of pixels is determined by the largest spatial range of a desired geometric transformation mapping across the entire input image;
   a transformation selector to generate control data to control a geometric transformation mapping based on a location of a current pixel being processed; and
   a hardware geometric transform engine to perform a geometric transformation mapping by switching on one path through the geometric transform engine from an input window to an output using the control data.

2. A system, comprising:
an input patch to receive a window of pixels of an input image;
a transformation selector to generate control data to control a geometric transformation mapping based on a location of a current pixel being processed; and
a hardware geometric transform engine to perform a geometric transformation mapping by switching on one path through the geometric transform engine from an input window to an output using the control data, wherein the hardware geometric transform engine further comprises:
a plurality of multiplexer banks to perform an initial geometric transformation mapping; and
an interpolator coupled with the plurality of multiplexer banks to perform an interpolated geometric transformation mapping to generate pixel data as a final transformed output of the window of pixels.

3. A system, comprising:
an input patch to receive a window of pixels of an input image;
a transformation selector to generate control data to control a geometric transformation mapping based on a location of a current pixel being processed, wherein the control data comprises a set of control bits generated by the transformation selector based on the location of a window of pixels: and
a hardware geometric transform engine to perform a geometric transformation mapping by switching on one path through the geometric transform engine from an input window to an output using the control data.

4. The system of claim 3, wherein the control bits are determined by piecewise forward difference operations in a set of region tiles that divide an image.

5. A method, comprising:
receiving a window of pixels of an input image, wherein a size of the window of pixels is determined by the largest spatial range of a desired geometric transformation mapping across the entire input image;
generating control data to control a geometric transformation mapping based on a location of a current pixel being processed; and
performing a geometric transformation mapping by switching on a path through a hardware geometric transform engine from an input window to an output using the control data.

6. The method of claim 5, wherein the window of pixels includes a fixed set of neighboring pixels around a current pixel.

7. A method comprising:
receiving a window of pixels of an input image;
generating control data to control a geometric transformation mapping based on a location of a current pixel being processed; and
performing a geometric transformation mapping by switching on a path through a hardware geometric transform engine from an input window to an output using the control data;
performing, with a plurality of multiplexer banks, the geometric transformation mapping; and
performing, with an interpolator, an interpolated geometric transformation mapping to generate pixel data as a final transformed output of the window of pixels.

8. A method comprising:
receiving a window of pixels of an input image;
generating control data to control a geometric transformation mapping based on a location of a current pixel being processed, wherein the control data comprises a set of control bits generated by the transformation selector based on the location of a window of pixels: and
performing a geometric transformation mapping by switching on a path through a hardware geometric transform engine from an input window to an output using the control data.

9. The method of claim 8, wherein the set of control bits are determined by piecewise forward difference operations in a set of region tiles that divide an image.

10. A method, comprising:
approximating a continuous functional transformation model using a quantized geometric transformation model; and
configuring a hardware geometric transform engine based on the quantized geometric transformation model.

11. The method of claim 10, further comprising:
receiving a window of pixels of an image; and
the hardware geometric transform engine performing a geometric transformation mapping of the window of pixels.

12. The method of claim 10, wherein the quantized geometric transformation model is approximated based on one or more properties of geometric distortion.

13. The method of claim 12, wherein the quantized geometric transformation model is a piecewise geometric transformation for a set of tiles that divide an image.

14. The method of claim 13, wherein the quantized geometric transformation model is optimized to minimize a mean square error between the continuous functional transformation model and the quantized geometric transformation model for the set of tiles.

15. The method of claim 14, wherein the quantized geometric transformation model is defined for a finite set of rectangular tiles that divide an image.

16. A non-transitory computer readable medium storing instructions thereon which, when executed by a system, cause the system to perform a method comprising:
approximating a continuous functional transformation model using a quantized geometric transformation model; and
configuring a hardware geometric transform engine based on the quantized geometric transformation model.

17. The non-transitory computer readable medium of claim 16, further comprising:
receiving a window of pixels of an image; and
the hardware geometric transform engine performing a geometric transformation mapping of the window of pixels.

* * * * *